United States Patent
Ryblad et al.

(10) Patent No.: US 6,584,787 B1
(45) Date of Patent: Jul. 1, 2003

(54) ARRANGEMENT AND METHOD FOR CONTROLLING A COMPRESSOR OF AN AIRCONDITIONING ARRANGEMENT IN A MOTOR VEHICLE

(75) Inventors: Ake Ryblad, Sodertalje (SE); Tord Jonsson, Stockholm (SE); Olle Kwarnmark, Jarna (SE)

(73) Assignee: Scania CV AB (Publ) (SE)

( * ) Notice: Subject to any disclaimer, the term of this patent is extended or adjusted under 35 U.S.C. 154(b) by 0 days.

(21) Appl. No.: 10/088,380

(22) PCT Filed: Sep. 20, 2000

(86) PCT No.: PCT/SE00/01818

§ 371 (c)(1),
(2), (4) Date: Mar. 15, 2002

(87) PCT Pub. No.: WO01/21424

PCT Pub. Date: Mar. 29, 2001

(30) Foreign Application Priority Data

Sep. 21, 1999 (SE) ................................................ 9903380

(51) Int. Cl.[7] .............................. B60H 1/32; F25B 27/00
(52) U.S. Cl. ....................................... 62/133; 62/323.4
(58) Field of Search ................................. 62/133, 323.4, 62/157, 158, 243

(56) References Cited

U.S. PATENT DOCUMENTS

| | | | |
|---|---|---|---|
| 4,359,875 A | 11/1982 | Ohtani ......................... | 62/133 |
| 5,415,004 A | 5/1995 | Iizuka ........................... | 62/133 |
| 6,038,871 A | * 3/2000 | Gutierrez et al. ............... | 62/133 |

* cited by examiner

Primary Examiner—Chen Wen Jiang
(74) Attorney, Agent, or Firm—Ostrolenk, Faber, Gerb & Soffen, LLP

(57) ABSTRACT

An arrangement and a method for controlling a compressor of an airconditioning arrangement for a motor vehicle, whereby the compressor is optionally driven through activation of a clutch arrangement. The compressor has an input shaft which, via a first wobble plate, acts through bearing elements on a second wobble plate. The second wobble plate is arranged to transmit a wobbling motion designed to drive pistons of a number of compressor units of the piston and cylinder type. A control circuit is designed for brief activation of the clutch arrangement at selected times to cause periodic movement of the bearing elements. The control circuit may be activated by the vehicle starter motor, the reverse gear or a timing circuit.

17 Claims, 3 Drawing Sheets

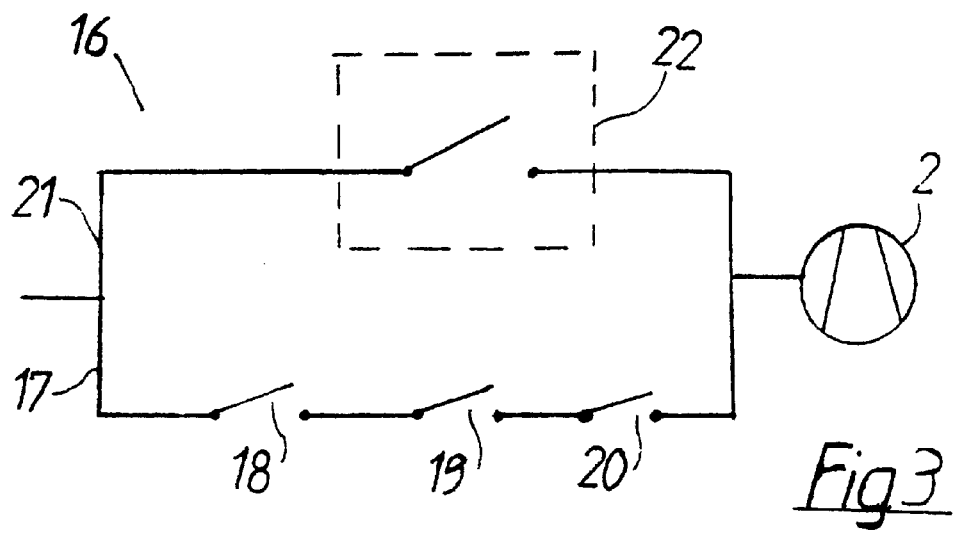
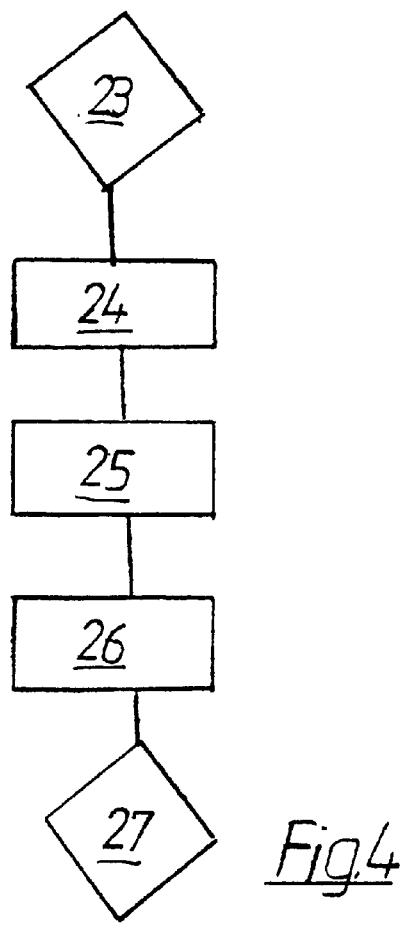

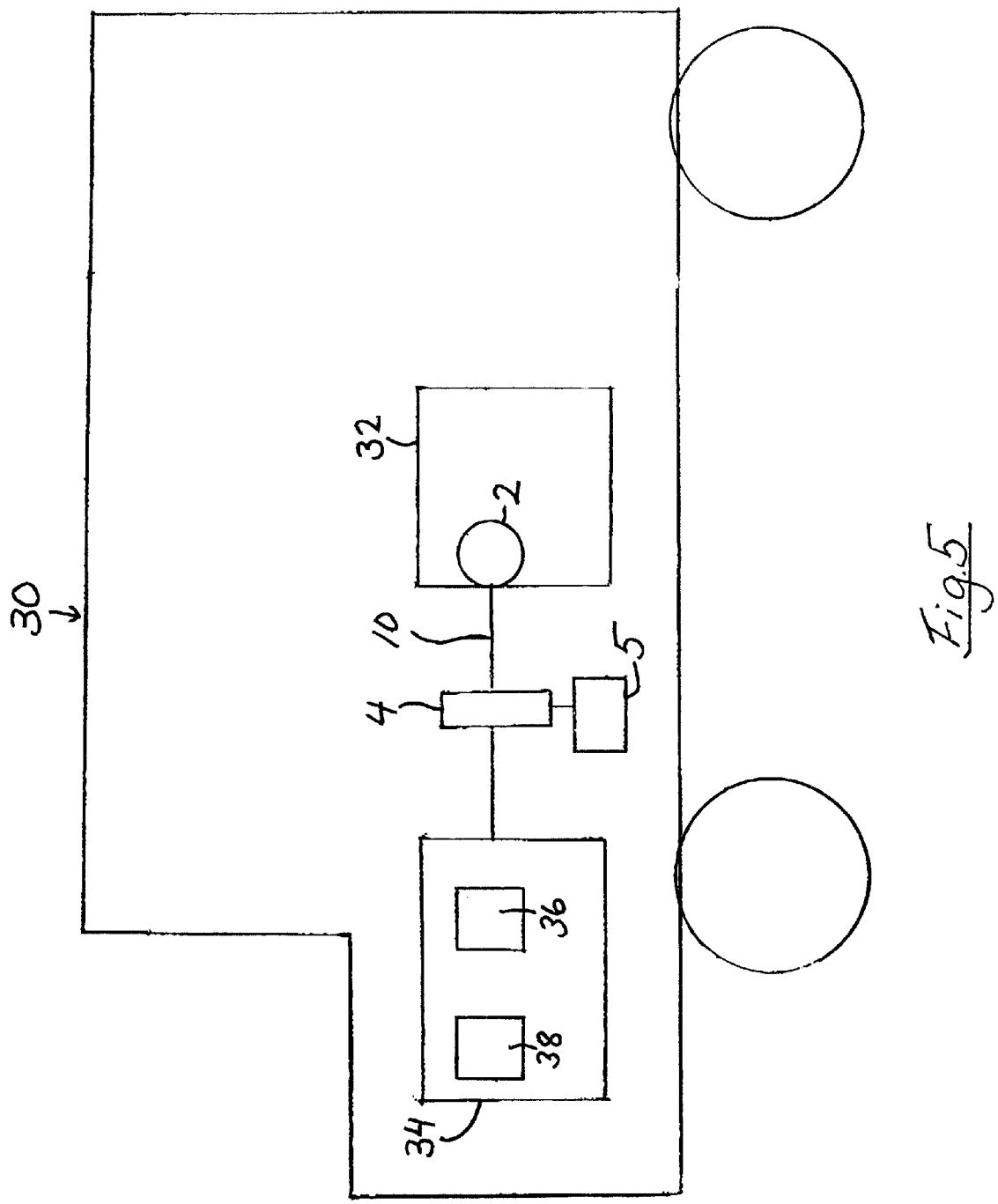

ARRANGEMENT AND METHOD FOR CONTROLLING A COMPRESSOR OF AN AIRCONDITIONING ARRANGEMENT IN A MOTOR VEHICLE

TECHNICAL FIELD

The present invention relates to an arrangement and a method for controlling a compressor of an airconditioning arrangement in a motor vehicle by selective operation of the input to the compressor.

DESCRIPTION OF THE STATE OF THE ART

Airconditioning arrangements for motor vehicles are usually driven direct from the engine via a clutch arrangement, which may take the form of a magnetic clutch. Activation of this clutch causes rotation of the compressor's input shaft and rotary operation of a wobble plate system, thereby causing operation of the compressor's compressor units.

The environment which prevails in the surroundings of a motor-vehicle-based compressor is arduous in that the compressor is subject to strong vibrations and great heat. As the compressor is driven via a belt, it has to be relatively rigidly fastened to the engine block to avoid belt tensioning problems, and such fastening has the effect of transmitting vibration and heat from the engine block to the compressor. This applies particularly in utility vehicles driven by diesel engines, in which high levels of engine vibration occur. Such vehicles are also often operated under heavy loading on long and frequent runs.

Compressors of airconditioning arrangements for industrial vehicles in particular, such as trucks and buses, are therefore usually affected by operating problems causing a significant service requirement, often including compressor replacement. Operational stoppages are therefore common, and even sometimes total breakdown of the compressor, resulting in irritation for drivers and expense for vehicle owners. Safety risks to the vehicle may also be involved.

OBJECTS AND MOST IMPORTANT CHARACTERISTICS OF THE INVENTION

One object of the invention is to indicate an arrangement and a method of the kind mentioned in the introduction whereby the problems of the state of the art are obviated or at least reduced. The invention concerns an arrangement and a method for controlling a compressor of an airconditioning arrangement for a motor vehicle, whereby the compressor is optionally driven through activation of a clutch arrangement. The compressor has an input shaft which, via a first wobble plate, acts through bearing elements on a second wobble plate. The second wobble plate is arranged to transmit a wobbling motion designed to drive pistons of a number of compressor units of the piston and cylinder type. A control circuit is designed for brief activation of the clutch arrangement at selected times to cause periodic movement of the bearing elements. The control circuit may be activated by the vehicle starter motor, the reverse gear or a timing circuit.

This object is achieved according to the invention by the features in the characterising parts of patent claims 1 and 6 respectively.

The resulting imposition of a certain amount of movement of the bearing elements between the wobble plates at selected times when the airconditioning arrangement is not being used prevents the bearing between the wobble plates being stationary at the same point for lengthy periods.

Under the state of the art it has in fact been found that running a vehicle with its airconditioning arrangement switched off causes local surface damage in the portions of the compressor's wobble plates adjacent to the bearing elements, because engine vibrations are imparted to and allowed to act on small surfaces for a long period of time. The invention ensures instead that the bearing elements move somewhat even if the vehicle driver does not activate the airconditioning arrangement, which means that over time the load can be distributed over larger areas of the bearing. The result is longer service life for the bearing and hence for the compressor as a whole. What is also achieved, if movement corresponding to a substantial portion of one revolution of the bearing elements is initiated, is that lubricant present in the compressor housing is propelled around on the moving parts, resulting in better lubrication and longer service life.

The state of the art whereby the wobble plates are stationary if the vehicle driver does not activate the airconditioning arrangement thus means that the engine vibrations transmitted to the compressor have a destructive effect on the wobble plates and bearing elements, entailing disruption of the bearing's lubricating characteristics and hence impaired bearing function and, ultimately, bearing shearing.

The bearing elements concerned usually consist of "needles" in the form of cylindrical pins incorporated in a needle bearing between the wobble places. This results in an inherently load-sensitive structure in compressors currently on the market, and consequently major susceptibility of the bearing as a whole to inadequate lubrication. The above-mentioned effect on the bearing takes substantially the form of indentations in bearing surfaces, known as fretting or pitting damage, which has been found to seriously impair the bearing's function and reduce its service life.

On inspection of a compressor that has broken down, it is not at all obvious what has caused the breakdown. Often the bearing elements have melted apart, eliminating all traces of the cause of the damage. Sometimes there has been drastic overheating of the magnetic clutch, causing short-circuiting and even fire in the winding.

It may be noted that previous attempts to achieve longer service life for airconditioning arrangements of vehicles have taken the form of constructional measures such as larger diameters for constituent elements of the compressor. However, such compressors have been substantially more expensive than standard components and have therefore not been economically justifiable in the vehicle industry.

The invention achieves significant advantages such as longer service periods for the airconditioning arrangement (preferably so that they can be matched with ordinary engine service periods), elimination of guarantee work in the form of compressor replacement etc., and less irritation and fewer problems for vehicle users and owners.

Activating the clutch arrangement at the time when the vehicle engine starts up achieves a preferred regular compressor activation. It is also desirable if activation takes place at the time of some other driver action such as reverse gear engagement or the like, but it is also possible for activation to take place without involving the driver at all, e.g. by means of a time circuit set so that activation takes place, for example, once each day or even somewhat more frequently, subject naturally to the vehicle engine being in operation so that driving power can be obtained via the magnetic clutch.

Further advantages are achieved by other aspects of the invention which are indicated below.

BRIEF DESCRIPTION OF THE DRAWINGS

The invention will now be described in more detail on the basis of examples of embodiments with reference to the attached drawings, in which:

FIG. 3 depicts schematically a control circuit according to the invention for a compressor, and FIG. 4 depicts a simplified block diagram of a method according to the invention.

FIG. 5 schematically shows a vehicle including the air-conditioning arrangement.

DESCRIPTION OF EMBODIMENTS

Figure 1:
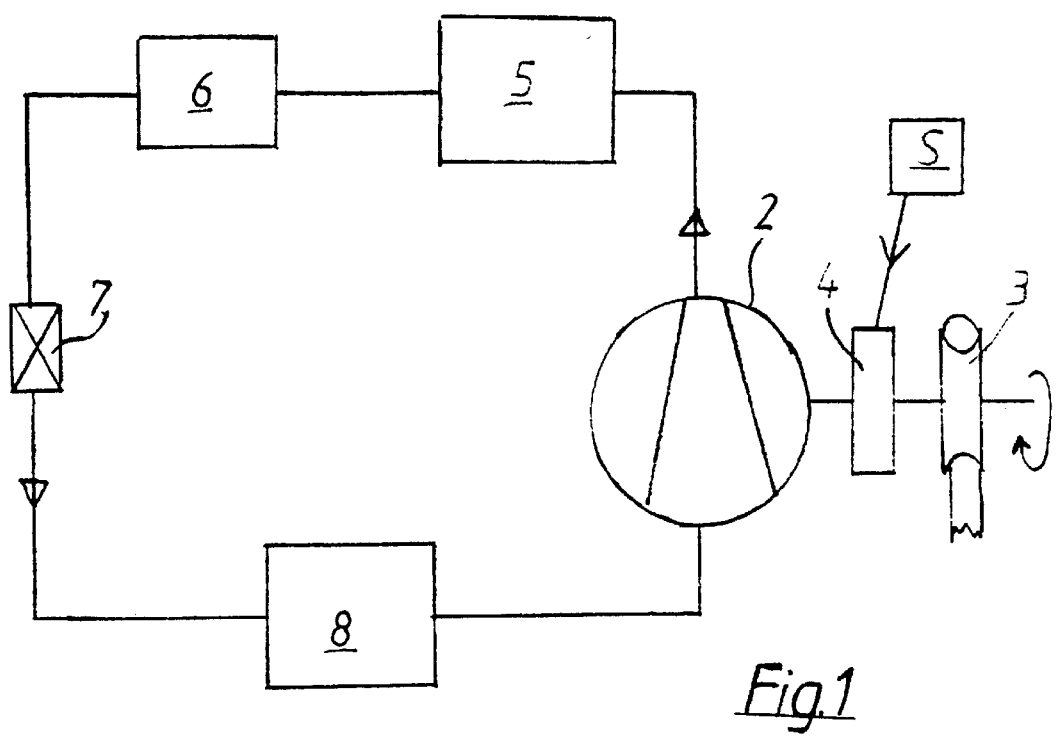
FIG. 1 depicts schematically the basic structure of an airconditioning arrangement.

FIG. 1 thus depicts schematically the basic structure of an airconditioning arrangement 32 for a motor vehicle 30. A compressor 2 is driven by a belt transmission 3 from the engine 34 of the vehicle concerned when the driver (or a control system) activates a magnetic clutch 4. Activation and partial activation of the magnetic clutch is also controlled by a control circuit S. Cooling medium in gas phase compressed by the compressor is led at a pressure of typically 8 to 20 bar to a condenser 5, after which the cooling medium in liquid phase is transferred via a cooling medium tank 6 (which constitutes a buffer for cooling medium) to an expansion valve 7. After the expansion valve, the cooling medium is led at a low pressure of typically 1.2 bar to the evaporator 8, after which the cooling medium returns to the compressor for repeat pressurisation. Heat exchange with the air intended for supply to the interior of the vehicle takes place in the evaporator 8.

Figure 2:
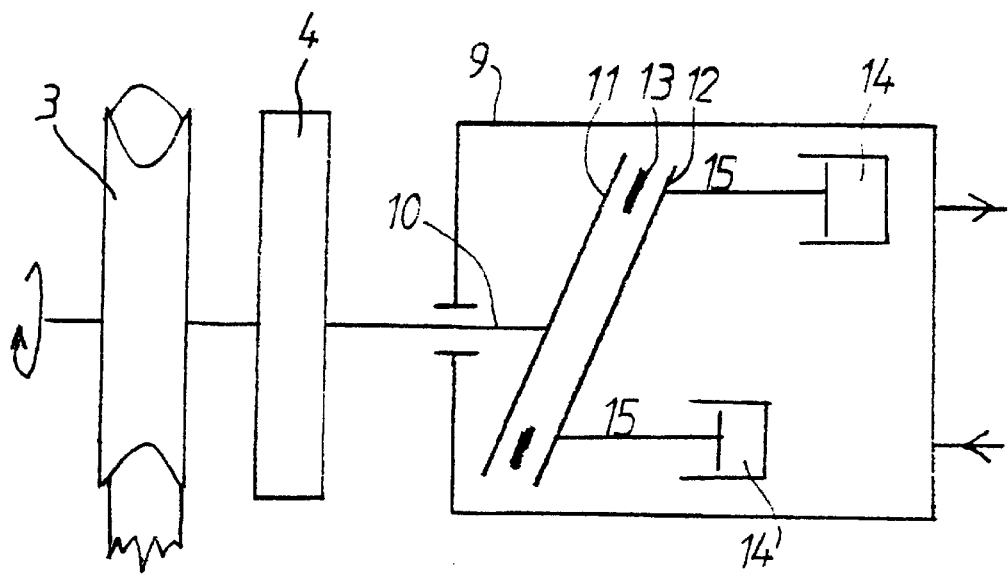
FIG. 2 depicts schematically a section through a compressor.

The compressor depicted schematically in FIG. 2 exhibits a housing 9 and an input shaft 10 which is connected to the belt transmission 3 via the magnetic clutch 4. The input shaft 10 is connected for rotation jointly with a rotatable first wobble plate 11 which, via a needle bearing 13, transmits a wobbling motion to the jointly rotating second wobble plate 12, which in its turn, via piston rods 15, drives compressor units 14 of the piston and cylinder type.

Deactivation of the clutch arrangement 4 thus brings this bearing 13 to a standstill, which has been found to result in damaging surface effects on the wobble plate bearing surfaces of the needle bearing 13, due to transmitted engine vibrations.

FIG. 3 depicts an example of a control circuit 16 for use in an arrangement according to the invention. The circuit portion 17 represents the conventional control circuit incorporating a starting button 18 for the airconditioning arrangement, 19 a safety button for breaking the circuit in the event of incorrect pressure (too low or too high) in the installation and a cooling protection with a contact arranged to break the connection when the evaporator is too cold.

In addition, the control circuit according to the invention incorporates a second parallel loop 21 which includes a contact 22 which is arranged to close for a compulsory brief period, e.g. upon activation of the vehicle's starter motor 36, upon activation of the vehicle's reverse gear or any other gear in a vehicle gear system 38, or at predetermined intervals of time, such as once or more often per day, provided that the vehicle engine is running so that compressor operation can be achieved.

FIG. 4 depicts a simplified operating sequence according to the invention, in which reference 23 denotes the start of the sequence. Reference 24 denotes activation of the control circuit, e.g. at the time of starting or reversing or in response to time control, or possibly at the time of two or three of these events. Monitoring of whether the engine is running takes place as applicable. The control system then sends a signal, e.g. in the form of a pulse of current, to the clutch arrangement at reference 25 for activation of the clutch arrangement for a predetermined period of time, e.g. corresponding to movement of the bearing elements through a small angle.

This angle may correspond to the diameter of a bearing element or preferably be up to, but less than, one full revolution. The exact amount of rotation may be random to ensure with a high degree of probability that the bearing elements do not again become stationary at the same point as before the activation. The activation may also be selected to be long enough for achieving a certain lubricant soaking of the compressor's constituent moving parts. This may possibly be achieved by as little as an activation corresponding to about one-third of one revolution. However, activation of the clutch arrangement is preferably limited so as to avoid pressure build-up in the compressor. Reference 26 denotes the end of the activation period and reference 27 the end of the sequence.

The invention may be varied within the scope of the invention and, for example, the control circuit may be constituted differently, e.g. in the form of an integrated circuit, possibly constituting an integral part of the vehicle's control system.

What is claimed is:

1. An apparatus for controlling a compressor of an air conditioning system, the apparatus comprising:

a compressor, a rotatable input shaft connected with the compressor such that rotation of the shaft operates the compressor, a drive to the input shaft for rotating the input shaft;

a clutch arrangement between the drive and the input shaft wherein the clutch arrangement may be activated to connect the drive to the input shaft for rotating the input shaft and the clutch arrangement may be deactivated for disconnecting the drive from the input shaft;

a first wobble plate connected with the input shaft for being rotated by the input shaft; the first wobble plate being inclined with respect to the input shaft;

a second wobble plate at the first wobble plate, the second wobble plate being non-rotatable with respect to the rotatable first wobble plate and the second wobble plate being inclined with respect to the input shaft, being correspondingly inclined to the first wobble plate, and being positioned and operable to drive pistons of piston-cylinder type compressor units as the inclined first wobble plate rotates which causes incline of the second wobble plate in correspondence with the incline of the first wobble plate;

bearing elements between the rotatable first wobble plate and the non-rotatable second wobble plate enabling rotation of the first wobble plate relative to the first wobble plate;

a control circuit connected with the clutch arrangement, the control circuit being operable to activate the clutch arrangement at selected time intervals for rotating the first wobble plate with respect to the second wobble plate which causes action of the bearing elements between the first and second wobble plates.

2. The apparatus of claim 1, wherein the apparatus is in a vehicle and the control circuit is connectable to a starter motor of the vehicle for the control circuit to activate the clutch arrangement upon activation of the vehicle starter motor.

3. The apparatus of claim 1, wherein the apparatus is in a vehicle and the control circuit is connectable to a vehicle reverse gear of the vehicle for the control circuit to activate the clutch device upon activation of the vehicle reverse gear.

4. The apparatus of claim 1, further comprising a time circuit connected with the control circuit, and the time circuit being operable to activate the control circuit at selected time intervals.

5. The apparatus of claim 1, wherein the apparatus is in a vehicle and the control circuit is connectable to a vehicle control system of the vehicle for the control circuit to activate the clutch arrangement upon activation of the vehicle control system.

6. The air conditioning apparatus of claim 1, including a condenser connected with the compressor for receiving fluid material compressed by the compressor, a cooling medium tank following the condenser, an expansion valve following the cooling medium tank and an evaporator following the expansion valve, with the evaporator being connected back to the compressor for completing a circuit.

7. A vehicle comprising:
an engine for driving the vehicle, a drive shaft from the engine;
an air conditioning system for the vehicle, the air conditioning system including a compressor; a rotatable input shaft connected with the compressor such that rotation of the input shaft operates the compressor;
a clutch arrangement between the drive shaft and the input shaft wherein the clutch arrangement may be activated to connect the drive shaft to the input shaft for rotating the input shaft and the clutch arrangement may be deactivated for disconnecting the drive shaft from the input shaft;
a first wobble plate connected with the input shaft for being rotated by the input shaft; the first wobble plate being inclined with respect to the input shaft;
a second wobble plate at the first wobble plate, the second wobble plate being non-rotatable with respect to the rotatable first wobble plate, being inclined with respect to the input shaft, being correspondingly inclined to the first wobble plate, and being positioned and operable to drive pistons of piston-cylinder type compressor units as the first inclined wobble plate rotates which causes incline of the second wobble plate in correspondence with the incline of the first wobble plate;
bearing elements between the rotatable first wobble plate and the non-rotatable second wobble plate enabling rotation of the first wobble plate relative to the first wobble plate;
a control circuit connected with the clutch arrangement, the control circuit being operable to activate the clutch arrangement at selected time intervals for rotating the first wobble plate with respect to the second wobble plate which causes action of the bearing elements between the first and second wobble plates.

8. The apparatus of claim 7, further comprising the vehicle engine including a starter motor connected to the control circuit to activate the clutch arrangement upon activation of the vehicle starter motor.

9. The apparatus of claim 7, wherein the vehicle includes driven elements driven by the engine and has several gear connections between the engine and the driven elements of the vehicle, including a vehicle reverse gear of the vehicle, the control circuit is connected to the reverse gear to activate the clutch arrangement upon activation of the a vehicle reverse gear.

10. The arrangement of claim 7, further comprising a time circuit connected with the control circuit, and the time circuit being operable to activate the control circuit at selected time intervals.

11. The apparatus of claim 7, further comprising a vehicle control system for the vehicle engine, the control circuit is connectable to the vehicle control system for the control circuit to activate the clutch arrangement upon activation of the a vehicle control system.

12. A method for controlling a compressor of an air conditioning system for a motor vehicle, wherein the vehicle has an engine, the compressor has an input shaft, a clutch arrangement between the vehicle engine and the compressor input shaft, a rotatable first wobble plate connected with and inclined with respect to the compressor input shaft, a non-rotatable second wobble plate at the first wobble plate and also inclined with respect to the input shaft and adapted to wobble with respect to the input shaft corresponding to the wobble of the rotating first wobble plate, and bearing elements between the rotatable first wobble plate and the non-rotatable second wobble plate permitting rotation of the first wobble plate with respect to the second wobble plate, the second wobble plate being inclined and oriented to drive pistons of a piston cylinder type compressor unit as the second wobble plate wobbles while the first wobble plate rotates;

the method comprising activating the clutch arrangement between the vehicle engine and the compressor input shaft at selected first time intervals, and deactivating the clutch arrangement at other time intervals for causing rotation of the first wobble plate at the selected first time intervals and activating the bearing elements between the first and second wobble. plates.

13. The method claim 12, further comprising the vehicle engine including a starter motor, activating the clutch arrangement for causing rotation of the first wobble plate upon activation of the vehicle starter motor.

14. The method of claim 12, wherein the vehicle engine has selectively activatable gears including a reverse gear, activating the clutch arrangement upon activation of the vehicle reverse gear.

15. The method of claim 12, further comprising activating the clutch arrangement periodically at selected time intervals.

16. The method of claim 12, further comprising activating the clutch arrangement for a time interval such that at the activation of the clutch arrangement, the first wobble plate rotates through less than one revolution.

17. The method of claim 12, further comprising limiting activation of the clutch arrangement for avoiding a build up of pressure in the compressor.

* * * * *